July 19, 1927.
T. L. STANDISH
1,636,447
SUBMARINE DETECTION FLOAT
Filed March 30, 1926
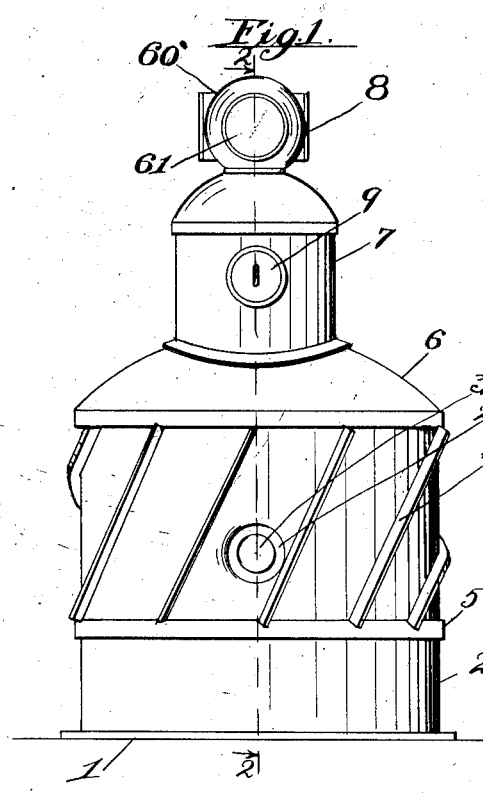
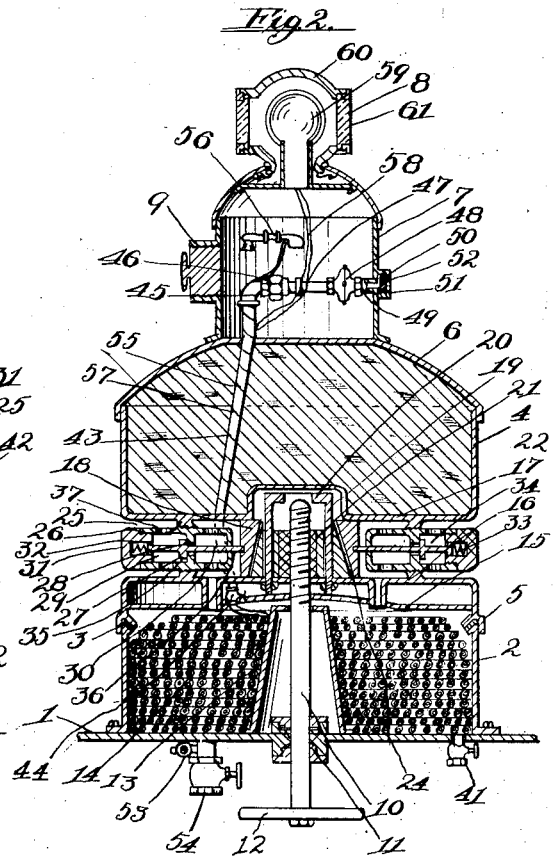
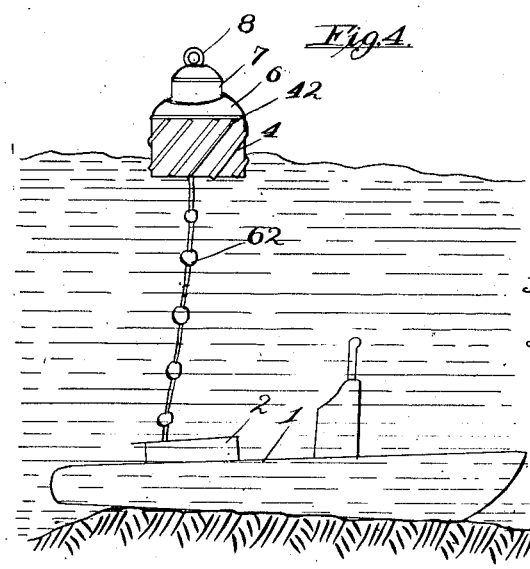
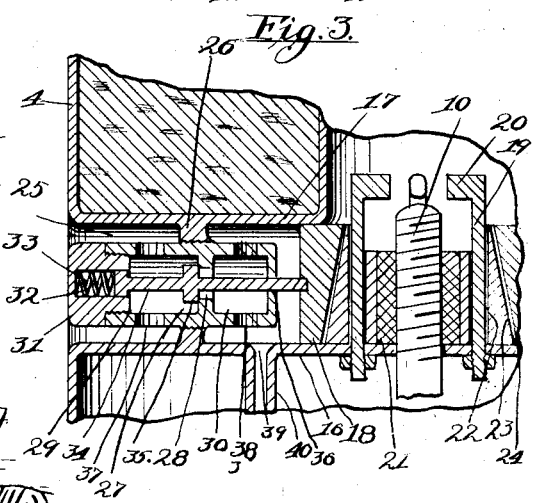
Inventor
Thomas L. Standish
by Hazard and Miller
Attorneys Patented July 19, 1927.

1,636,447

UNITED STATES PATENT OFFICE.

THOMAS L. STANDISH, OF LOS ANGELES, CALIFORNIA.

SUBMARINE DETECTION FLOAT.

Application filed March 30, 1926. Serial No. 98,485.

My invention is a submarine detection float adapted to be loosened from a submarine, float to the surface and form a means of communication between the surface and the submarine, as well as having an air supply and a light signal.

An object of my invention is to form a detection float for a submarine which may be readily released from within the submarine and will rise by its own buoyancy to the surface and in rising the float is designed to rotate slowly and therefore uncoil an air hose through which air may be drawn or forced to the submarine.

Another object of my invention is to have a telephone cable and communication from the float to the submarine and to have a lighting system in the float illuminated by current from the submarine, whereby the float may be easily detected at either day or night.

Another object of my invention is to form a float and a hose coiling tub secured together on the submarine by a releasing screw extending into the body of the submarine and having an operative handle therein. In normal operation the tub and a chamber below the base of the float are designed to be watertight and to contain air. The action of releasing the float opens valves allowing water to flow from outside the float into the tub; hence equalizing the pressure on all sides of the float and allowing its ready release by the release screw. The hose and connection therefrom through the float are so arranged that a partial air supply may be drawn through the hose so that the officers will be continuously informed that the device is in operative condition.

My invention will be more readily understood from the following description and drawings, in which;

Figure 1 is a side elevation of the float and hose containing tub as mounted on the deck of a submarine;

Fig. 2 is a vertical section on the line 2—2 of Fig. 1;

Fig. 3 is a partly enlarged detail of the equalizing valve construction shown in Fig. 2;

Fig. 4 is a diagrammatic view illustrating a sunken submarine with the float on the surface.

Referring particularly to Figs. 1 and 2, the deck of a submarine is indicated by the numeral 1 on which is secured a circular hose tub 2; this being secured to the deck of the vessel and having a rubber gasket or the like 3 on the upper edge. The float 4 is preferably cylindrical and has a double flange 5 on the lower edge adapted to make a watertight fit with the gasket 3 as hereunder set forth. The float preferably has a domed upper surface 6 with a turret 7 extending thereabove and a light 8. The body of the float is preferably filled for the most part with buoyant material such as cork. The turret is hollow, being closed by a watertight door 9 to allow access to the hose or telephone as hereunder set forth.

The releasing and hold-down mechanism for the float is substantially as follows, having reference particularly to Figs. 2 and 3:

A release screw 10 extends upwardly through the deck of the submarine having a water-tight stuffing box 11 and an operating wheel 12 in an accessible position in the submarine. A hub 13 prevents the coiled hose 14 from engaging the releasing screw. The float is provided with a base plate 15 adapted to fit snugly over the coiled hose and prevent its shifting out of position when the float is secured to the tub.

A locking framing consists of a lower set of cross bars or diaphragms 16 and an upper set of cross bars or diaphragms 17; these bars or diaphragms being arranged to form a slide for the wedge blocks 18. A series of bolts 19 extend upwardly from the diaphragm 16 and have inwardly bent ends 20. A nut 21 having a series of holes 22 through which the bolts are inserted is threaded on the releasing screw 10. The nut and wedge block 18 have complementary wedging surfaces 23 and 24.

The equalizing valves are constructed substantially as follows, having reference particularly to Figs. 2 and 3:

A recess 25 extends inwardly from the outer walls of the float, there being an inner wall 26 joining the diaphragms 16 and 17. A valve cage 27 is secured to the wall 26, the cage having a port 28 leading from the outer end 29 to the inner end 30 of the cage. The cap 31 of the cage is provided with a recess 32 in which is a coiled spring 33, this latter bearing on the valve plunger 34 thrusting the valve 35 against the port 28. The valve plunger is journaled in the rear end 36 of the valve cage. The cage is provided with an outer port 37 and an inner port 38, and the diaphragm 16 has a series of openings 39 leading to pipes 40 which extend through the base plate 15.

The action of the equalizing valves is substantially as follows:

It will be understood that when the float is secured to the submarine the releasing screw is rotated in such a direction as to pull down tightly on the nut 21, thereby holding the float in close engagement with the upper edge of the hose tub. The tub has a drain cock 41 through which any water that may be in such tub when the float and the tub are connected, may be drawn off and air admitted by opening the valves when the float is above the surface of the water.

The port 28 is normally maintained closed by the spring 33 so that water cannot pass through such port when the vessel submerges; the water however, may flow freely in and out of the port 37 and when it is desired to release the float the hand wheel is turned in the proper direction to force the nut 21 upwardly. Thus the wedge surfaces 23 and 24 co-acting, press the wedge blocks 18 outwardly, thereby pressing the valve 35 from the port 28 and allowing the free flow of water through the ports 34, 28, 38, the passage 39 and pipe 40 into the hose tub; thus equalizing the pressure on all sides of the float.

The continued rotation of the releasing screw shoves the nut 21 against the inwardly turned ends 20 of the bolts 19 so that the further rotation of the releasing screw shoves the float upwardly and positively releases same. It is immaterial then whether or not the nut 21 drops and allows the wedge blocks 18 to move inwardly and the valve 35 to close the ports.

The float is provided with a series of fins 42 positioned at such an angle so that in the upward movement of the float it is given a rotary movement on its vertical axis; this movement being arranged to agree substantially with the uncoiling of the hose, thus preventing the hose becoming twisted as the float rises.

A pipe 43 extends from the turret through the body of the float and has a coupling 44 connected to the hose. A swivelled elbow 45 in the turret is joined by a union 46 to a section of hose 47; this hose having a coupler 48 one half of which is connected to a pipe 49 leading to an air inlet 50. This inlet has a seat with small prongs 51 holding a rubber plug 52 in position. Thus if desired the plug may be inserted before a submarine submerges and block the passage of air and water downwardly into the submarine; or if desired the plug may be omitted and air could be drawn through the hose while the submarine is on the surface and partly submerged. The small amount of water which would enter the hose on submerging would be more or less immaterial and could be drawn off by a suitable drain cock 53 at the valved coupling 54 for the hose in the interior of the vessel.

If the plug is utilized when the float has risen to the surface of the water the crew of the submarine may force air through the hose and expel the plug from place, thereby allowing air to be drawn through the hose into the submarine.

The hose is preferably specially made and has an electric cable indicated by the numeral 55 imbedded therein, this leading to a telephone 56, access to which may be had through the door 9 and also having an electric light cable 57 having an electric lead 58 through the turret to the lamp 59. This lamp is mounted in a dome 60 having a series of heavy glass lenses 61 adapted to withstand high hydraulic pressure at any depth to which the submarine is apt to be submerged.

When the float is sighted by a rescue vessel either by noting the float or the light, the crew of such vessel may open the door 9 and communicate by telephone with the submarine. They may also undo the hose coupler 48 and swivel the free end of the hose to extend through the door 9 and by means of a complementary coupler couple the hose from their own vessel to such coupler and thereby pump air to the submarine.

It will thus be seen that my invention provides means for uncoiling a hose from a submarine and allows either the submarine to draw air therethrough or to have air forced downwardly by a rescue vessel and also to allow telephone communication. The float is constructed in a simple manner for releasing and for holding it in place.

Although I have shown the arrangement as being built on the deck of a submarine, it is apparent that the float could be placed in a suitable chamber in the body of the submarine, below, and be released in a similar manner, releasing a portion of the deck at the same time if desired. Such changes in the general construction and specific details to adapt my invention to different arrangements for attachment, would be within the spirit of same as set forth in the description, drawings and claims.

It will be noted that the hose is provided with a series of floats 62, such floats partly buoying the hose as indicated in Fig. 4.

Having described my invention, what I claim is:

1. A submarine detection float comprising in combination a hose containing receptacle adapted to be attached to a submarine, a float adapted to rest on said receptacle, means to release the float from the receptacle, and means to rotate the float to uncoil the hose.

2. A submarine detection float comprising in combination a submarine having a receptacle for hose, a float detachably connected to the submarine, the float having a connection with the hose, and means to rotate the float to uncoil the hose.

3. A submarine detection float comprising in combination a submarine having a receptacle for coiling hose, a float having a connection to the hose, the float having a chamber with a door, whereby access to the free end of the hose may be had through the door, the free end of the hose being provided with a coupler, one side of the coupler being connected through the side of the float, the other side of the coupler being adapted to swivel and extend through the door.

4. A submarine detection float comprising in combination a hose receptacle adapted to be attached to a submarine, a float having a watertight connection to said receptacle, a nut having a limited sliding movement mounted in the float, a releasing screw extending through a wall of the submarine and engaging the nut, and means to rotate the screw to release the float.

5. A submarine detection float as claimed in claim 4, having in addition valves operated by the movement of the nut to allow passage of water to the hose receptacle.

6. A submarine detection float as claimed in claim 4, having in addition valves mounted in the float having a slidable valve plunger, a wedging block connected to said plunger, the wedging block and the nut having cooperative wedge surfaces, and means to allow partial sliding movement of the nut to force the wedge block outwardly on releasing the float and open the valves to flow water into the hose receptacle.

7. A submarine detection float comprising in combination a hose tub, a float having a water-tight connection to the tub, a nut mounted in the float for limited reciprocating movement, a releasing screw engaging the nut and extending into the body of the submarine, means to restrict the movement of the nut in an upward direction, a valve communicating from the exterior to the hose tub, said valve having a plunger, means to operate said plunger by the upward movement of the said nut, a hose coiled in the hose tub having a connection to the float, a turret forming a chamber in the upper part of the float, a hose connection through the wall of the turret, a coupling on said connection, and a door in the turret through which access may be had to the coupling.

8. A submarine detection float as claimed in claim 7, having in addition a telephone in the turret having telephone wires incorporated in the hose leading to the submarine.

9. A submarine detection float as claimed in claim 7, having in addition fins on the side of the float adapted to rotate same to uncoil the hose.

10. A submarine detection float as claimed in claim 7, having in addition floats attached to the hose at spaced intervals, adapted to support part of the weight of the hose when the float is at the surface and the submarine submerged.

11. In a submarine detection float, a releasing screw extending vertically from the body of the submarine and having the operating end in the submarine, a plurality of upwardly extending bolts secured to a base plate of the float, a nut threaded on the screw, slidable on the bolts, and means on the bolts to restrict the upward movement of the nut, whereby rotation of the screw in one direction forces the float upwardly and releases same.

12. In a submarine detection float as claimed in claim 11, having in addition a valve cage having a plurality of ports, a plunger slidably mounted in the cage, a valve on the plunger adapted to close one of the ports, a spring normally pressing said plunger to close said port, a wedging device between the plunger and the nut, adapted to move the plunger and open the said port on the movement of the nut, and a water passage through the other ports leading through the base plate of the float.

In testimony whereof I have signed my name to this specification.

THOMAS L. STANDISH.